Nov. 24, 1959  R. A. REDDING  2,914,717
ELECTRONIC FOLLOW-UP SYSTEM
Filed March 1, 1957
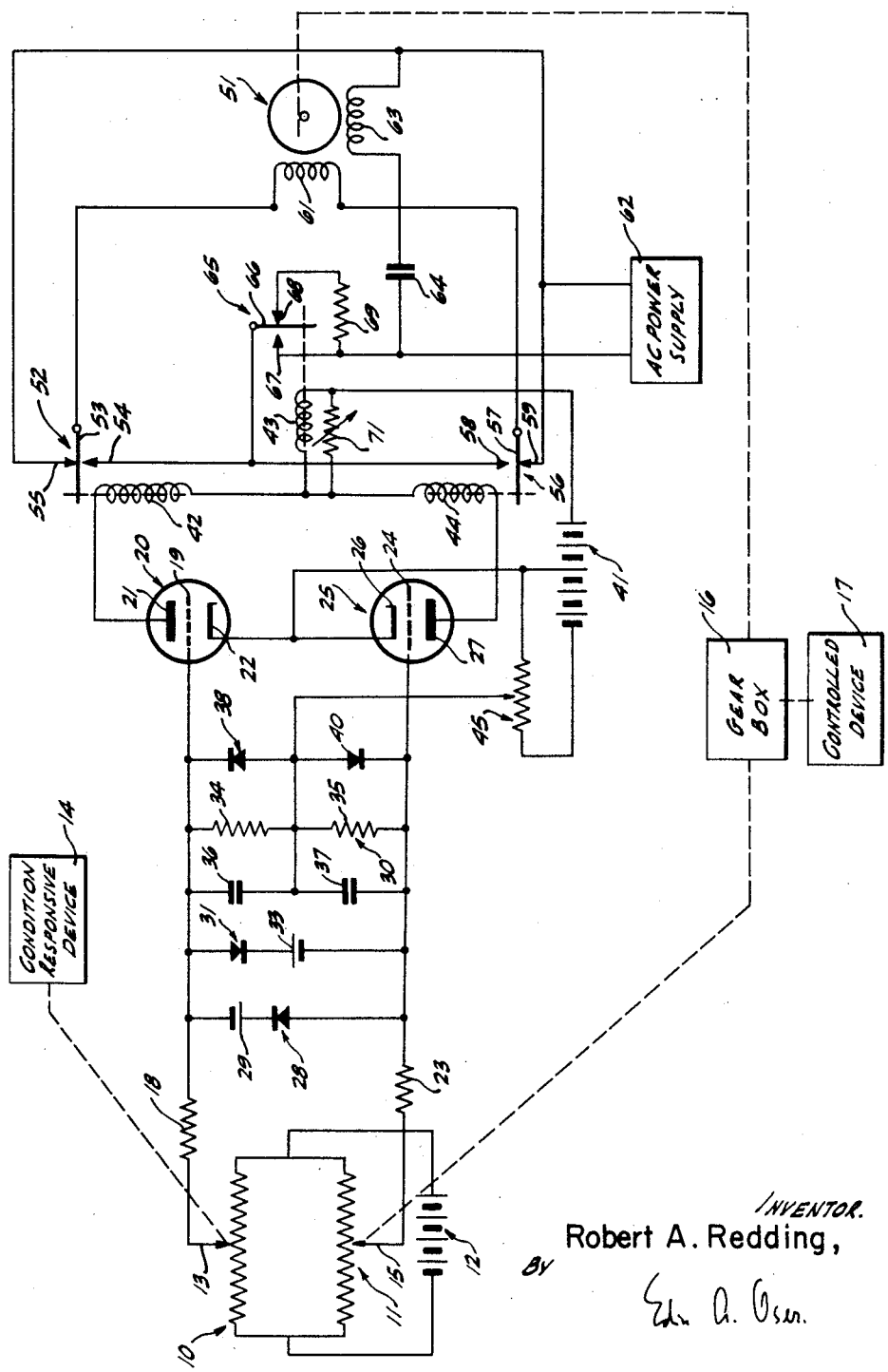
INVENTOR.
Robert A. Redding,
BY
AGENT United States Patent Office 2,914,717
Patented Nov. 24, 1959

2,914,717

ELECTRONIC FOLLOW-UP SYSTEM

Robert A. Redding, Culver City, Calif., assignor to Hughes Aircraft Company, Culver City, Calif., a corporation of Delaware Application March 1, 1957, Serial No. 644,190

5 Claims. (Cl. 318—29)

The present invention relates to electronic control circuits and more particularly to an electronic follow-up system.

In prior art systems of this type a condition-responsive member and a member to be controlled, in conjunction with an alternating-current (A.C.) bridge network, provide an error signal which serves to control a motor which is coupled to the member to be controlled. The motor is also coupled to a movable contact on the A.C. bridge network and thus tends when driven to reduce the error signal. If the error signal is large, many prior art systems have a disadvantage in that the error signal amplifiers connected between the control motor and signal source may become saturated and may thus cause overshoot of the null position.

In the prior art follow-up systems of the type described, A.C. error signals are used and therefore the complexity of the system is increased through the necessity of transformers, rectifiers, and shielding of leads to prevent stray signal pick-up.

It is therefore an object of the present invention to provide an improved electronic follow-up system.

Another object of the present invention is to provide an electronic follow-up system utilizing direct-current error signals.

A further object of the present invention is to provide a direct-current electronic follow-up system which has a high rate of error reduction when the error signal is large and which automatically changes to a relatively low rate of error reduction as the null condition is approached to prevent overshoot.

In accordance with the present invention a direct-current (D.C.) potential is applied across a pair of potentiometers forming a bridge network, with the movable contact of one potentiometer being controlled by a condition-responsive device. The movable contact of the other potentiometer is controlled by a servo motor which is also coupled to a device to be controlled.

The difference in potential between the movable contacts of the two potentiometers provides the input or error signal to a pair of electronic amplifiers in a manner such that the entire signal is applied to one or the other of the amplifiers. Each amplifier serves to control a relay which is electromagnetically coupled to an associated relay switch. When one or the other of the switches is closed the motor is energized and drives in a direction which reduces the amplitude of the error signal. The error signal applied to the amplifiers is limited to a predetermined amplitude such that saturation of the amplifiers is prevented and also grid current flow is limited or prevented (depending on the bias arrangement).

A third relay is connected in series with each of the before-mentioned relays and serves to control the amplitude of the voltage applied to the motor in a manner such that the motor drives (or rotates) at a rapid rate when the error signal is large and automatically rotates at a slower rate as the null position is approached. Thus overshoot of the null position is prevented.

The novel features that are considered characteristic of the electronic follow-up system of the present invention are set forth with particularity in the appended claims. The invention itself, however, both as to its organization and method of operation as well as additional objects and advantages thereof, will be best understood from the following description when read in conjunction with the accompanying drawing and in which, The single figure is a circuit diagram of a preferred embodiment of the electronic follow-up system of the present invention.

In the drawing a pair of potentiometers 10 and 11 are connected in parallel to form a bridge network and are supplied with a direct current (D.C.) potential by a D.C. voltage source shown for purposes of illustration as a battery 12. It may be found advantageous, as will be explained later, to provide each of the potentiometers 10 and 11 with a relatively high volts per turn ratio. The first potentiometer 10 has a movable contact 13 coupled to a condition-responsive device 14 (as shown schematically by the dotted line) which serves to control the voltage setting of the movable contact 13. The condition-responsive device 14 may be selected to be responsive to any desired physical condition. By being coupled to the movable contact 13 the potential of the movable contact 13 is made to represent a certain value of the physical condition. One of the most common condition-responsive devices used in conjunction with electronic follow-up systems of the type herein disclosed is a thermostat, and thus the potential of contact 13 is representative of temperature.

The potentiometer 11 has a movable contact 15 mechanically coupled to a gear box 16, as shown schematically by a dashed line, which is in turn geared to a controlled device 17. The controlled device 17 may be any of a wide variety of devices to be controlled, as is well known in the art, by an electronic follow-up system of the type disclosed by the present invention.

The movable contact 13 of the first potentiometer 10 is coupled through a voltage dropping or current limiting resistor 18 to a control electrode 19 of a first electronic amplifier such as a triode 20 having an anode 21 and a cathode 22. In a similar manner the movable contact 15 of the second potentiometer 11 is coupled through a voltage dropping resistor 23 to a control electrode 24 of a second electronic amplifier such as a triode 25 having a cathode 26 and an anode 27.

A first clamping diode 28 is connected in series with a source of D.C. potential such as a battery 29 between the dropping resistors 18 and 23 and thus between the control electrodes 19 and 24. In a similar manner a second clamping diode 31 is connected in series with a second source of D.C. bias, such as a battery 33 which provides a voltage equal to that of battery 29, between the dropping resistors 18 and 23. The first diode 28 has its cathode connected to the positive terminal of the battery 29 and the second diode 31 has its cathode connected to the positive terminal of the second source of D.C. bias 33. It will be noted that the diodes 28 and 31 provide conduction of current in opposite directions.

It is thus seen that the first and second diodes 27 and 31 are biased in a nonconducting condition as long as the voltages existing at the control electrodes 19 and 24 are approximately equal. When the potential difference between the movable contacts 13 and 15 is greater than a predetermined value (which is substantially equal to the voltage of either battery 29 or 33) one or the other of the diodes 28 and 31 will be rendered conductive depending on the polarity of the potential difference. Therefore the magnitude of the potential difference between the movable contacts 13 and 15 is limited. Since the diodes 28 and 31 in conjunction with the batteries 29 and 33 serve as voltage clamps, it is evident that Zener diodes could well be utilized to perform the voltage clamping function.

A voltage divider network 30, including a pair of resistors 34 and 35, is connected between the control electrodes 19 and 24 of the triodes 20 and 25. An A.C. by-pass capacitor 36 may be connected in parallel with the resistor 34 and a similar by-pass capacitor 37 may be connected in parallel with the resistor 35. The capacitors 36 and 37 serve to remove A.C. signal components which might be superposed on the potential difference between the movable contacts 13 and 15. A unidirectional current-conductive device such as a diode 38 is also connected in parallel with the resistor 34, and a similar unidirectional current-conductive device such as a diode 40 is connected in parallel with the resistor 35. The voltage divider network 30 in conjunction with the diodes 38 and 40 serves to apply the full potential difference between the movable contacts 13 and 15 either to one or to the other of the triodes 17 and 24. This will be more fully explained in conjunction with the explanation of the operation of the circuit.

A source of D.C. bias such as a battery 41 provides the operating current for each of the amplifiers 20 and 25. To this end the anode 21 of the triode 20 is coupled to the positive terminal of the battery 41 through first and second current operated relay windings 42 and 43. In a similar manner the anode 27 of the second triode 25 is coupled to the positive terminal of the battery 41 through a third current operated relay winding 44 and the second relay winding 43. The cathodes 22 and 26 are interconnected directly and are also connected to an intermediate tap on the battery 41.

A third potentiometer 45 provides the bias for the control electrodes 19 and 24 and is itself provided with operating potential by the battery 41. To this end one end of the potentiometer 45 is connected to the negative terminal of the battery 41 and the other end is connected to the intermediate tap to which the cathodes 22 and 26 are connected. The control electrode 19 is coupled to the variable tap of the potentiometer 45 through the resistor 34, and the control electrode 24 is coupled to the potentiometer tap through the resistor 35. Thus each of the control electrodes 19 and 24 is maintained at a potential which may be adjusted by the variable tap of potentiometer 45. It is to be noted however that in the illustrated embodiment of the present invention the bias provided by the potentiometer 45 can never make the control electrodes 19 and 24 more positive than the potential at which the cathodes 22 and 26 are maintained. As will be more fully explained later the potential difference between the associated control electrode and cathode of each of the triodes 20 and 25 may advantageously be adjusted to a value such that each triode is biased slightly below cut off.

The relays 42 and 44 serve to control the direction of movement of the movable contact 15 of the first potentiometer 11 by controlling a driving motor, shown schematically at 51, which is mechanically coupled to the movable contact 15 through the gear box 16. To provide this control function the relay 42 controls a first relay switch 52 having a movable contact arm 53 and first and second fixed contacts 54 and 55. In a similar manner the relay 44 controls a second switch 56 having a movable contact arm 57 and a pair of first and second stationary contacts 58 and 59.

The motor 51 has a control winding 61 which is connected in series between the first contact arms 53 and 57 of the switches 52 and 56. The first contact 54 of the first switch 52 is connected directly to the first contact 58 of the second switch 56, and the second contact 55 of the first switch 52 is connected directly to the second contact 59 of the second switch 56. The contacts 55 and 59 are also connected directly to a first terminal of a source of motor driving potential shown for purposes of illustration as an A.C. voltage source 62.

The motor 51 may be an A.C. motor and is thus shown for purposes of illustration as having a primary winding 63, one end of which is connected directly to the first terminal of the A.C. voltage source 62, and the other of which is coupled to the second terminal of the A.C. voltage source 62 through a phasing capacitor 64. Thus the primary winding 63 is continuously supplied with A.C. voltage.

The relay winding 43, which is serially connected with each of the relay windings 42 and 44, serves to control the amplitude of the driving voltage applied to the control winding 61 of the motor 51. To this end the relay 43 controls a third switch 65 having a movable contact arm 66 and first and second stationary contacts 67 and 68. The first stationary contact 67 is connected directly to the second terminal of the A.C. voltage source 62 and the second stationary contact 68 is connected to the first stationary contact 67 through a dropping resistor 69. The contact arm 66 is connected directly to the first contacts 54 and 58 of the first and second switches 52 and 56.

The contact arms of the three switches 52, 56, and 65 are shown in the drawing in the position which they occupy during the quiescent condition of the circuit (zero signal input condition). That is, the contact arm 53 of the first switch 52 is in electrical contact with the contact 55, the contact arm 57 of the second switch 56 is in electrical contact with the contact 59, and the contact arm 66 is in electrical contact with the contact 68. Therefore since the second terminal of the voltage source 62 is coupled to the contacts 54 and 58 of the first and second switches through the switch 65, there is no complete electrical circuit from the control winding to the two terminals of the voltage source 62. Thus the control winding 61 of the driving motor 51 is seen to be de-energized.

The control winding 61 of the driving motor 51 will remain in a de-energized condition as long as the contact arms 53 and 59 are in the positions above described. This will of course be the state of the circuit as long as the potential difference between the movable contacts 11 and 13 is zero. As soon as sufficient current flows through one of the relay windings 42 or 44 to energize the associated relay switch the motor will be energized as will be more fully explained later.

The relays 42 and 44 are selected to have a pull-in current which is less than the pull-in current of the relay 43 and thus the relay 43 will not be energized until a substantially larger current flows through either one or the other of the relay windings 42 or 44 than is necessary to energize either of the relays 42 or 44.

The third potentiometer 45 which controls the bias applied to each of the amplifiers 20 and 25 may be advantageously set to a value such that each amplifier is biased slightly below cut off. Thus there will normally be no anode current flowing in either amplifier and the relays 42, 43, and 44 will all be de-energized. The relays 42 and 44 are then selected such that in response to the minimum conduction of the associated amplifier the relay will be energized. The relay 43 is selected to have a larger pull-in current than either of the relays 42 or 44. If the amplifiers were not biased to cut off in the absence of an input error signal, the relays 42, 43, and 44 would have to be so selected that for zero potential difference between the control electrodes 19 and 24 the relays would be de-energized.

If the physical parameter to which the condition-responsive device 14 is sensitive changes, the movable contact 13 will be moved to a new point of potential on the first potentiometer 10. Thus depending upon which direction the movable contact is moved the potential of the contact 13 will be made more positive or less positive than the potential of the movable contact 15 of the second potentiometer 11. Assuming the potential of the movable contact 13 of the first potentiometer 10 should become more positive than the potential of the movable contact 15 of the second potentiometer 11, the control electrode 19 becomes more positive with respect to its cathode 22 and the first triode 20 will be rendered conductive.

The diode clamp 40 in conjunction with the voltage divider network 30 prevents the second triode 24 from becoming conductive. That is, as the potential of the control electrode 19 becomes more positive than the potential of the control electrode 24, current tends to flow through the resistors 34 and 35 of the voltage divider network 30. However, as soon as current begins to flow through the resistor 35 the junction point of the resistors 34 and 35 rises in potential to become more positive than the potential of the control electrode 24. Since the diode 40 has its anode connected to the junction point of the resistors 34 and 35 and its cathode connected to the control electrode 24 it will become forward biased and conductive, providing a substantially short-circuit path around the resistor 35. Thus the potential of the control electrode 24 will remain substantially equal to the potential at which it was previously held by the voltage source 41 in conjunction with the third potentiometer 45. Therefore the full signal composed of the potential difference between the movable contacts 13 and 15 is applied to the first triode 20, and the second triode 25 remains in the condition which it was in when the potential difference between the movable contacts 13 and 15 was zero.

The diode 31 in conjunction with the battery 33 limits the amplitude of the signal applied to the control electrode 19 to a value which prevents the amplifier 20 from becoming saturated. The relay winding 42 (and also the relay winding 44) is so selected that for the minimum signal amplitude, which causes a minimum current to flow through the triode 20, the relay will be energized. Thus when the triode 20 is rendered slightly conductive the relay 42 is energized. Consequently, the arm 53 of the first switch 52 is pulled into contact with the contact 54. As a result the control winding 61 of the motor 51 is energized through an electrical circuit which is completed from the first terminal of the A.C. voltage source 62 through the contact 59 and arm 57 of the second switch 56, the control winding 61, the arm 53 and the contact 54 of the first switch 52, the arm 66 and contact 68 of the third switch 65, the dropping resistor 69 and thence back to the second terminal of the A.C. voltage source. Hence the motor drives in a direction to move the movable contact 15 of the second potentiometer 11 in a direction to reduce the error signal. If the polarity of the assumed potential difference between the movable contacts 13 and 15 were reversed, a similar action would take place as above described and the relay 44 would be energized. Thus the direction of current flow through the control winding 61 would be reversed (or reversed in phase) and the motor 51 would rotate in an opposite direction.

From the above description of the operation of the follow-up system of the present invention it is readily seen that the condition-responsive device 14 could be coupled to the movable contact 15 of the second potentiometer 11 in place of being coupled to the movable contact 13 of the first potentiometer 10. If this were done, the movable contact 13 could be manually or otherwise set to any voltage which would be the analogue of a desired physical parameter. Hence any change of that physical parameter to which the condition-responsive member would be sensitive would cause the movable contact 15 to be displaced and thus an error voltage supplied to one or the other of the amplifiers. Hence as the motor 51 returned the movable contact 15 to the original balance condition the controlled device 17 would be made to change the physical conditions which originally caused the condition-responsive device 14 to become operative.

Since the relay 43 has a larger pull-in current than the relay 42, as long as the triode 20 is in the above assumed state of minimum conduction the relay 43 remains deenergized. Since the dropping resistor 69 is then in series with the control winding 61 of the motor 51, the driving voltage is less than it would be if the dropping resistor 69 were not in the circuit. Thus the motor 51 is driven at a relatively slow speed and the rate of error correction is relatively slow.

If the difference in potential between the movable contacts 13 and 15 of the potentiometers 10 and 11 becomes larger and in the same sense as above described, then the triode 20 will be rendered more highly conductive to pass a larger current and the relay 42 will be energized. Sufficient anode current then flows to energize the relay 43 as well as the relay 42. Consequently the arm 53 of the switch 55 is pulled into contact with the contact 54, the arm 66 of the switch 65 is pulled into contact with the contact 67, and the dropping resistor 69 is no longer in series with the control winding 61 of the motor 51. The energizing current path for control winding 61 is then from the first terminal of the voltage source 62 through the contact 59 and arm 57 of the second switch, the control winding 61, the arm 53 and contact 54 of the first switch, the arm 66 and contact 67 of the third switch and thence to the second terminal of the voltage source 62. As a result the full voltage of the A.C. voltage source 62 is applied to the control winding 61 and the motor 51 drives the movable contact 15 of the second potentiometer 11 at a rapid speed in a direction which decreases the error signal.

As the null condition is approached the error signal applied to control electrode 19 is reduced, which reduces the conduction of the amplifier 20. The relay 43 is then de-energized which causes the dropping resistor 69 to be placed again in series with the control winding 61. Thus the driving speed of the motor 51 is automatically reduced. As soon as the null condition is reached, the previously energized relay 42 is de-energized and the control winding 61 of the motor 51 is de-energized. This is seen since the second terminal of the A.C. voltage source 62 is coupled only to the primary winding 63 of the motor 51 and to the contacts 54 and 58 of the first and second switches 52 and 56 (through the dropping resistor 69 and the contact 68 and arm 66 of the third switch 65). Thus the control winding 61 is energized only when one of the arms 53 or 57 is pulled into electrical contact with the corresponding contact 54 or 58.

In order that the pull-in current for the relay 43 may be varied to provide control of the relationship of error signal amplitude-to-motor driving speed, a variable resistor 71 may be placed in parallel with the relay 43. If this is done, the relay 43 may be identical to the relays 42 and 44 since the resistor 71 will shunt the relay 43 and therefore necessitate a larger anode current to cause the relay 43 to be energized. Thus by increasing or decreasing the resistance of the variable resistor 71 the amount of current which passes through the relay 43 may be controlled and thereby the amount of error signal (potential difference between the movable contacts 13 and 15) required to cause the relay 43 to be energized may be controlled.

By applying a relatively large D.C. voltage to the potentiometers 10 and 11, a high volts/turn ratio is obtained and very little physical movement of the movable contacts 13 is required to provide a large error signal. Thus the rate of correction can be made quite high for a small physical error. If a large D.C. voltage is thus supplied to the potentiometers 10 and 11, it would be possible for the amplifiers to become saturated in the event of a large physical displacement between the movable contacts 13 and 15. Such saturation is, however, prevented by the diode-battery networks of the diodes 28 and 31 in conjunction with the voltage dropping resistors 18, 23 and the batteries 29 and 33. The level at which the error signal is limited is so selected that for the limited signal level either of the amplifiers 20 or 25 will be rendered sufficiently conductive to energize the relay 43.

While it is to be expressly understood that the circuit specifications for the electronic follow-up system of the present invention may vary according to the design for any particular application, the following values for the components of the circuit of the drawing are included by way of example only:

| | |
|---|---|
| Potentiometer 10 | 100,000 ohms. |
| Potentiometer 11 | 100,000 ohms. |
| Resistor 18 | 10,000 ohms. |
| Resistor 23 | 10,000 ohms. |
| Resistor 34 | 470,000 ohms. |
| Resistor 35 | 470,000 ohms. |
| Batteries 29 and 33 | 1.4 volt Mercury batteries. |
| Diodes 28, 31, 38 and 40 | Hughes type 1N55. |
| Relays 42, 43, and 44 | Sigma Corporation type 5F5000S. |
| Resistor 71 | 20,000 ohms variable. |

The electronic follow-up system provided in accordance with the above listed specifications provided rapid and accurate follow-up between the movable contact 13 and the movable contact 15.

What is claimed is:

1. An electronic positioning system comprising first and second potentiometers having first and second adjustable taps, respectively, corresponding extremities of said first and second potentiometers being connected together; means for impressing a direct-current potential across said first and second potentiometers, whereby a difference in the relative position of said first adjustable tap with respect to the position of said second adjustable tap produces a direct-current error signal between said first and second adjustable taps; first and second electron discharge devices including first and second control grids and first and second cathodes, respectively, said first and second cathodes being connected together, said first control grid being connected to said first adjustable tap of said first potentiometer, and said second control grid being connected to said second adjustable tap of said second potentiometer; first and second resistors connected in series combination from said first control grid to said second grid; means connected to the junction between said first and second resistors for producing a bias potential on said first and second control grids with respect to said first and second cathodes, respectively; first and second diodes connected in shunt across said first and second resistors, respectively, said first and second diodes being poled in directions to allow current to flow away from said junction between said first and second resistors whereby said direct-current error signal appears on only one of said first and second control grids of one of said first and second electron discharge devices thereby to cause an increase in current flow through said one electron discharge device; and means responsive to said increase in current flow through said one electron discharge device for moving one of said first and second adjustable taps in a direction to decrease the amplitude of said direct-current error signal.

2. The electronic positioning apparatus as defined in claim 1 including additional means connected from said first adjustable tap of said first potentiometer to said second adjustable tap of said second potentiometer for limiting the amplitude of said direct-current error signal.

3. The electronic positioning apparatus, as defined in claim 1 wherein said means connected to the junction between said first and second resistors for producing a bias potential on said first and second control grids with respect to said first and second cathodes, biases said first and second control grids beyond cutoff whereby no current normally flows through either of said first and second electron discharge devices.

4. The electronic positioning apparatus as defined in claim 1 wherein said means responsive to the increase in current flow through said one electron discharge device for moving said one adjustable tap in a direction to decrease the amplitude of said direct-current error signal includes first and second relays including first and second solenoid coils, respectively, said first and second solenoid coils being connected in series with each of said first and second electron discharge devices, respectively, and being responsive to said increase in current flow; a motor mechanically coupled to said one adjustable tap of said one potentiometer; a power supply for energizing said motor; and means connecting said motor through said first and second relays to said power supply to rotate said motor in a direction determined by the increase in current flow through said one electron discharge device.

5. The electronic positioning apparatus as defined in claim 4, additionally including a third relay connected in series combination with both said first and second electron discharge devices, said third relay being energized only when the current flow through said first or second electron discharge device exceeds a predetermined value and including switching contacts for introducing a third resistor in series with said motor only when said current flow is less than said predetermined value thereby to decrease the rate at which said motor moves said one adjustable tap.

References Cited in the file of this patent

UNITED STATES PATENTS

| | | |
|---|---|---|
| 2,389,939 | Sparrow | Nov. 27, 1945 |
| 2,534,801 | Siltamaki | Dec. 19, 1950 |
| 2,579,648 | Chudyk | Dec. 25, 1951 |
| 2,674,708 | Husted | Apr. 6, 1954 |